United States Patent
Hatfield et al.

(10) Patent No.: US 11,983,034 B1
(45) Date of Patent: May 14, 2024

(54) WEARABLE ELECTRONIC DEVICE AND COMPLIANT INTERFACE THEREFOR

(71) Applicants: Dustin A. Hatfield, Los Gatos, CA (US); Daniel J. Spence, Pacifica, CA (US); Lee M. Panecki, San Francisco, CA (US); Cameron A. Harder, San Francisco, CA (US)

(72) Inventors: Dustin A. Hatfield, Los Gatos, CA (US); Daniel J. Spence, Pacifica, CA (US); Lee M. Panecki, San Francisco, CA (US); Cameron A. Harder, San Francisco, CA (US)

(73) Assignee: APPLE INC., Cupertino, CA (US)

(*) Notice: Subject to any disclaimer, the term of this patent is extended or adjusted under 35 U.S.C. 154(b) by 967 days.

(21) Appl. No.: 16/934,665

(22) Filed: Jul. 21, 2020

Related U.S. Application Data

(60) Provisional application No. 62/884,906, filed on Aug. 9, 2019.

(51) Int. Cl.
  *G06F 1/16* (2006.01)
  *B29C 64/393* (2017.01)
  (Continued)

(52) U.S. Cl.
  CPC ........... *G06F 1/163* (2013.01); *B29C 64/393* (2017.08); *B33Y 10/00* (2014.12); *B33Y 50/02* (2014.12);
  (Continued)

(58) Field of Classification Search
  CPC ... G06F 1/163; G02B 27/0176; B29C 64/393; B33Y 10/00; B33Y 50/02; B33Y 80/00;
  (Continued)

(56) References Cited

U.S. PATENT DOCUMENTS 6,388,640 B1  5/2002  Chigira et al.
9,176,325 B2  11/2015  Lyons
(Continued)

FOREIGN PATENT DOCUMENTS

EP   1619535 B1   2/2008
JP   H11119148 A  4/1999
WO   2018194325 A1  10/2018

*Primary Examiner* — Mustak Choudhury
(74) *Attorney, Agent, or Firm* — Young Basile Hanlon & MacFarlane, P.C.

(57) ABSTRACT

A compliant interface for a wearable electronic device includes a three-dimensional lattice structure that is coupleable to the wearable electronic device and compressible to conform to one or more of a facial feature or an upper cranial feature of a user wearing the wearable electronic device. The compliant interface may be one of a facial interface of a head-mounted display unit, a head interface of a head-mounted display unit, or a head interface of a headphones unit. The three-dimensional lattice structure may be formed of silicone that may form less than 35% of a volume of the three-dimensional lattice structure in an uncompressed state. Compliance of the facial interface may vary by locations at which the compliant interface engages the user. The compliance may vary according to one or more of geometric stiffness or maximum deflection of the three-dimensional lattice structure.

24 Claims, 8 Drawing Sheets

(51) Int. Cl.
- *B33Y 10/00* (2015.01)
- *B33Y 50/02* (2015.01)
- *B33Y 80/00* (2015.01)
- *G02B 27/01* (2006.01)
- *B29K 83/00* (2006.01)
- *B29L 31/34* (2006.01)

(52) U.S. Cl.
CPC .......... *B33Y 80/00* (2014.12); *G02B 27/0176* (2013.01); *B29K 2083/00* (2013.01); *B29L 2031/3475* (2013.01); *B29L 2031/3481* (2013.01)

(58) Field of Classification Search
CPC ......... B29K 2083/00; B29L 2031/3475; B29L 2031/3481
See application file for complete search history.

(56) References Cited

U.S. PATENT DOCUMENTS

| | | | |
|---|---|---|---|
| 10,021,922 | B2 | 7/2018 | Brandt |
| 10,095,275 | B2 | 10/2018 | Byun et al. |
| 10,251,774 | B2 | 4/2019 | Shah et al. |
| 10,256,859 | B2 | 4/2019 | Fei et al. |
| 2015/0250971 | A1 | 9/2015 | Bachelder et al. |
| 2015/0273170 | A1 | 10/2015 | Bachelder et al. |
| 2016/0198681 | A1 | 7/2016 | Fyfe et al. |
| 2017/0216078 | A1 | 8/2017 | Rivlin et al. |
| 2018/0071979 | A1* | 3/2018 | Achten .................. B33Y 10/00 |
| 2018/0098919 | A1 | 4/2018 | Pallari et al. |
| 2018/0341286 | A1* | 11/2018 | Markovsky ............ A42B 3/127 |
| 2018/0348863 | A1* | 12/2018 | Aimone ................. A61B 5/378 |
| 2019/0038471 | A1 | 2/2019 | Naya et al. |
| 2019/0076614 | A1 | 3/2019 | Groenewege et al. |
| 2019/0079301 | A1* | 3/2019 | Sauers ............... G02B 27/0176 |

\* cited by examiner

WEARABLE ELECTRONIC DEVICE AND COMPLIANT INTERFACE THEREFOR

CROSS-REFERENCE TO RELATED APPLICATION(S)

This application claims priority to and the benefit of U.S. Provisional Application No. 62/884,906, filed Aug. 9, 2019, the entire disclosure of which is incorporated by reference herein.

TECHNICAL FIELD

This disclosure relates to wearable electronic device and, more particularly, interfaces therefor.

BACKGROUND

Wearable electronic devices may be worn by different users with different anatomical features, which may lead to inconsistent user experience and inconsistent user comfort.

SUMMARY

Disclosed herein are implementations of compliant interfaces for wearable electronic devices. In an implementation, a compliant interface for a wearable electronic device includes a three-dimensional lattice structure that is coupleable to the wearable electronic device and compressible to conform to one or more of a facial feature or an upper cranial feature of a user wearing the wearable electronic device. In an implementation, a head-mounted display unit includes a display assembly having a display and a compliant interface coupled to the display assembly. The compliant interface includes a three-dimensional lattice structure that is compressible to conform to one or more of a facial feature or an upper cranial feature of a user wearing the head-mounted display unit.

The compliant interface may be one of a facial interface of a head-mounted display unit, a head interface of a head-mounted display unit, or a head interface of a headphones unit. The three-dimensional lattice structure may be formed of silicone that may form less than 35% of a volume of the three-dimensional lattice structure in an uncompressed state. Compliance of the facial interface may vary by locations at which the compliant interface engages the user. The compliance may vary according to one or more of geometric stiffness or maximum deflection of the three-dimensional lattice structure.

In an implementation, a compliant interface for a head-worn electronic device includes a chassis and one or more compliant structures. The chassis is for coupling to the head-worn electronic device. The one or more compliant structures are coupled to the chassis and that provide different compliance at different locations at which the compliant interface engages anatomical features of a head of a user wearing the head-worn electronic device.

The compliant interface may extend left-to-right over the head of the user and may include a central segment and outer segments extending from opposite sides of the central segment. The central segment and the outer segments may have a common thickness. The one or more compliant structures includes a three-dimensional lattice structure that provides the central segment and the outer segments with the different compliance that varies by one or more of geometric stiffness or maximum deflection. The central segment corresponds to a central protruding point of the head of the user and has greater compliance than the outer segments, or the outer segments correspond to outer protruding points of the head of the user and have greater compliance than the central segment.

In an implementation, a method is provided for developing a compliant interface for a wearable electronic device. The method includes prototyping a component of the compliant interface with a three-dimensional lattice structure to simulate compliance characteristics of the component formed with another material. The method may further include determining compliance characteristics for the component with a first material, prototyping the component with a different material, testing the prototyped components, and mass producing the component with the other material.

In an implementation, a method is provided for providing a compliant interface for a wearable electronic device. The method includes: scanning one or more of a head or a face of a user in three dimensions; determining compliance characteristics for a compliant interface according to the scanning; and providing the compliant interface according to the determining.

The providing may include selecting the compliant interface or a component of the compliant interface having predetermined compliance characteristics. The determining may include determining the compliance characteristics uniquely to the user according to the scanning, and the providing may include uniquely manufacturing the compliant interface with the compliance characteristics. The compliant interface may include a three-dimensional lattice structure. The three-dimensional lattice structure may be formed of an elastomer with an additive manufacturing process. The compliant interface may be one of a facial interface for a head-mounted display unit, a head interface for a head-mounted display unit, or a head interface for a headphones unit.

DETAILED DESCRIPTION

Disclosed herein are compliant interfaces for wearable electronic devices, such as head-mounted display units and headphones. The compliant interface conforms to the user to support the wearable device thereon, while providing comfort to the user. Compliance and other structural properties of the compliant interface vary by location to account for differences in anatomical features between different users. As a result, a single version of a compliant interface may be used comfortably by several different users having different forms of anatomical features, or compliant interfaces may be partially or fully customizable to each user.

Figures 1A, 1B:
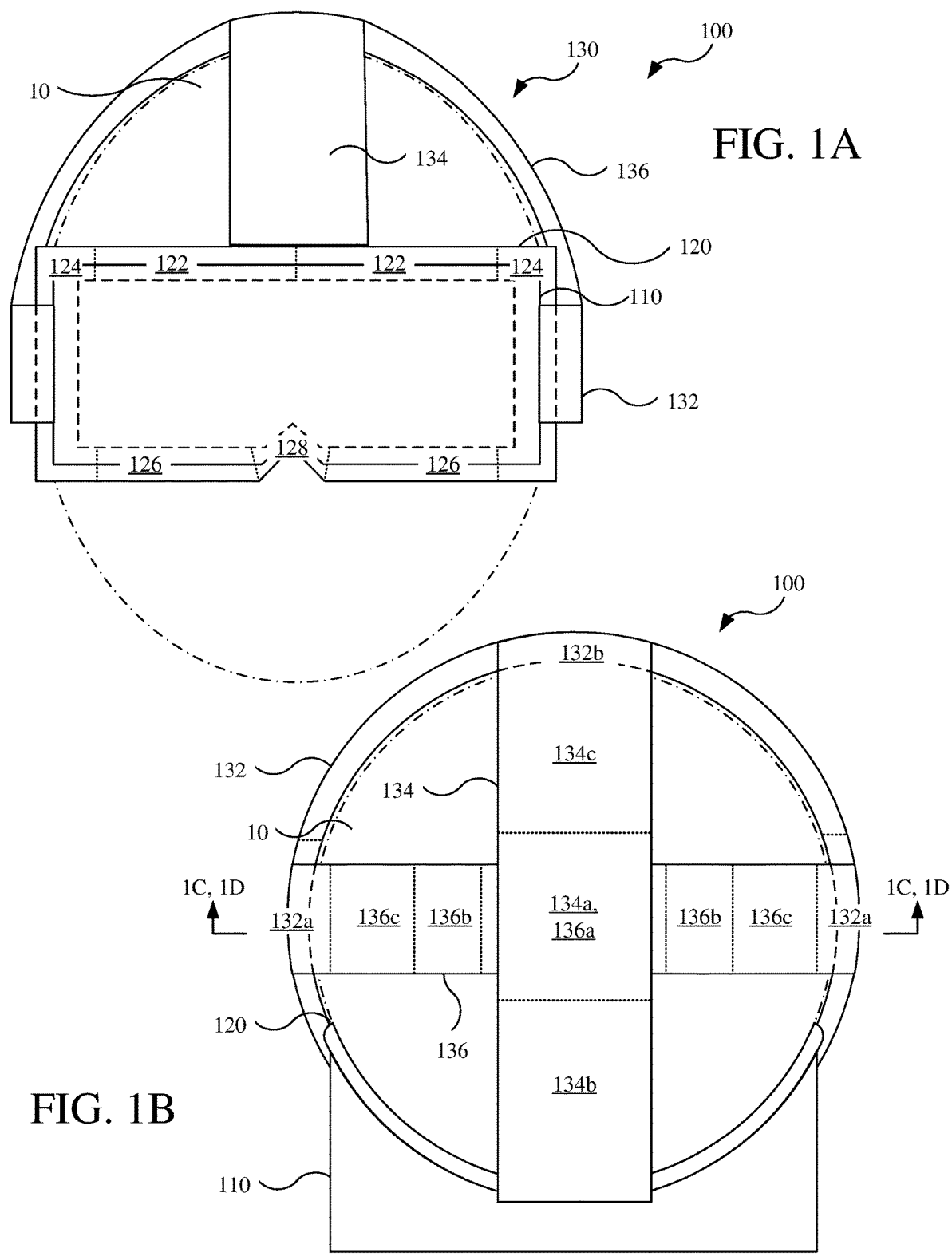
FIG. 1A is a front view of a head-mounted display unit worn on a head of a user.
FIG. 1B is a top view of the head-mounted display unit worn on the head of the user.
Figure 1C:
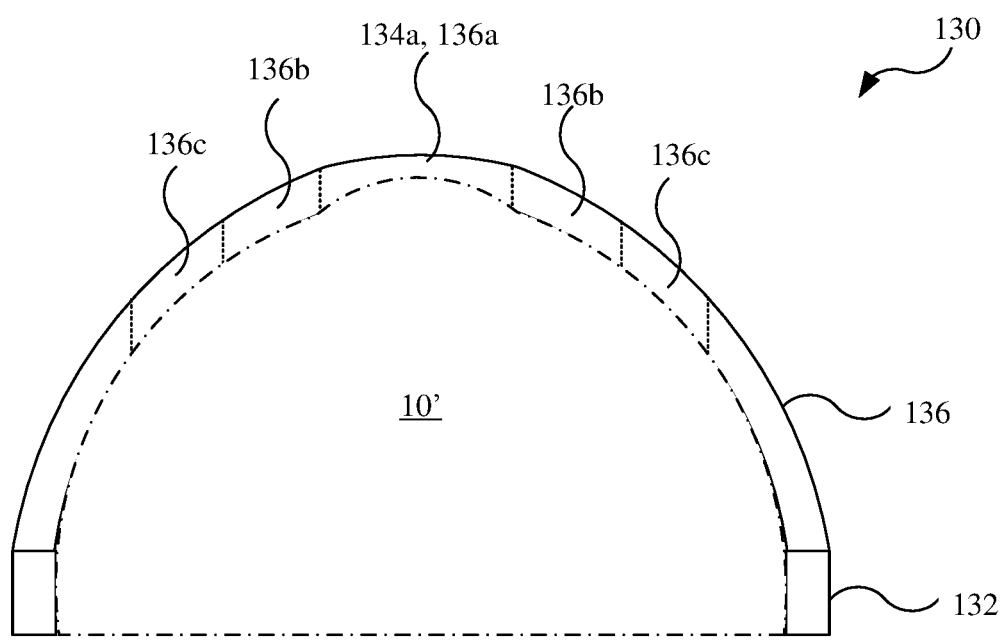
FIG. 1C is a cross-sectional view of the head-mounted display unit taken along line 1C-1C in FIG. 1B and worn on a pointed-shape head.
Figure 1D:
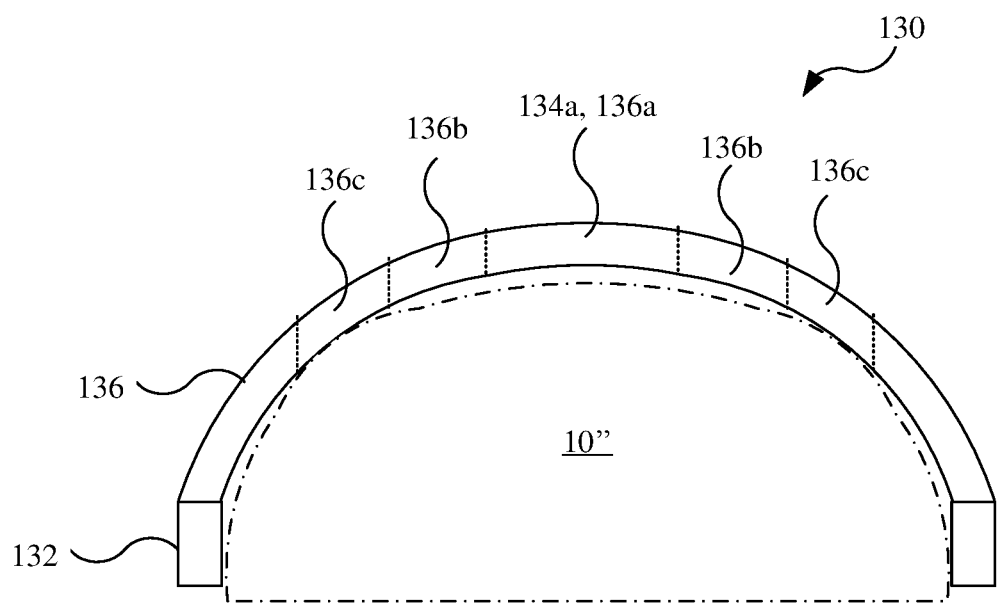
FIG. 1D is a cross-sectional view of the head-mounted display unit taken along line 1D-1D in FIG. 1B and worn on square-shaped head.
Figure 2:
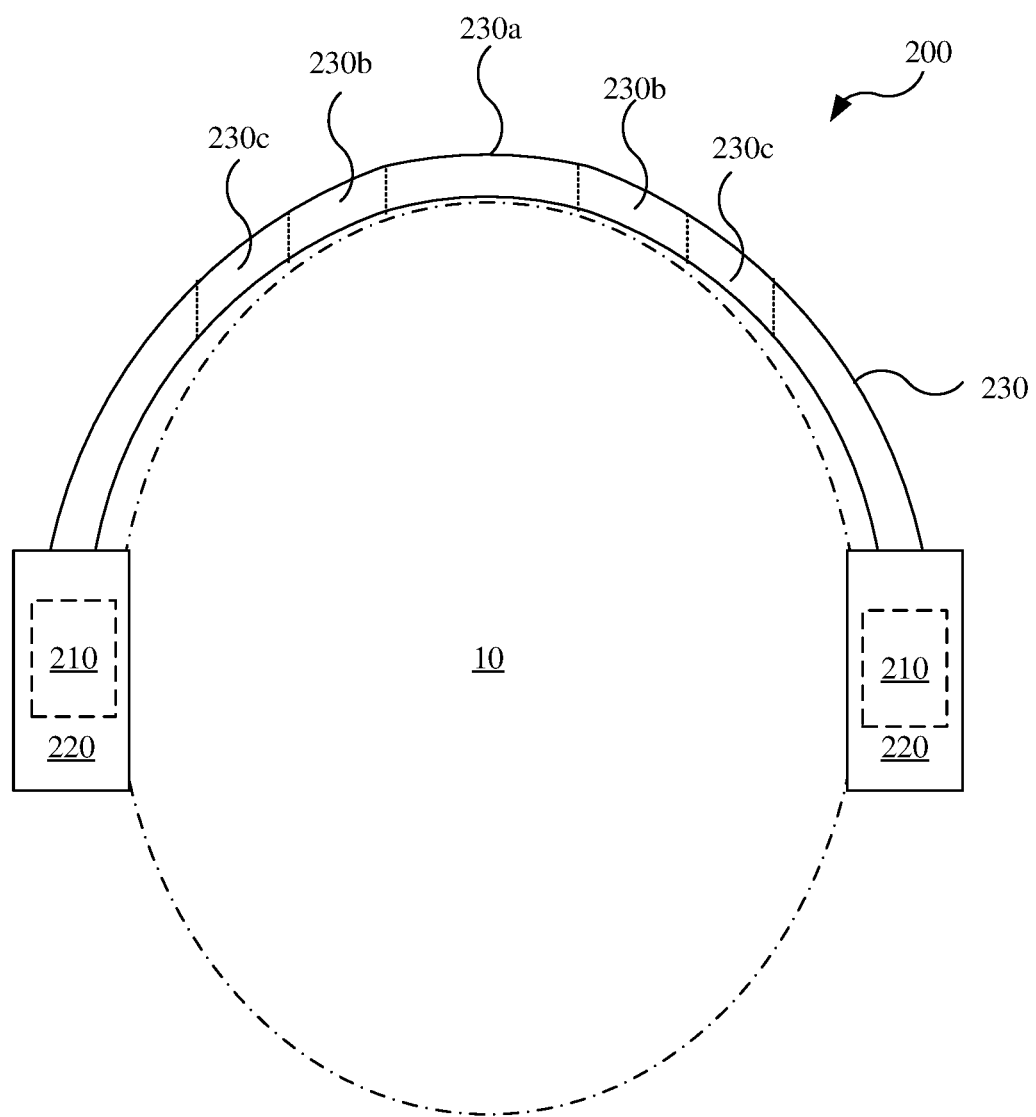
FIG. 2 is a front view of a headphones unit worn on a head of a user.

Referring to FIGS. 1A-1B, a wearable device 100 is a head-mounted display unit that includes a display module 110, a facial interface 120, and a head interface 130. The head-mounted display unit 100 may be used to provide graphical content of a computer-generated reality (discussed in further detail below). The display module 110 includes a generally rigid outer housing, which contains various electronics (not shown), such as one or more displays, a controller and processing device, and power electronics. In FIGS. 1A-2, dash-dash lines generally represent hidden components, dash-dot lines represent a portion of the human body, and dot-dot lines represent demarcations between different portions or segments of components of the facial interface 120 and the head interface 130.

The facial interface 120 is coupled to the display module 110 and engages the face of the user to support the display module 110 thereon for displaying graphical content to the user. The facial interface 120 also functions to locate the display module 110, especially the displays thereof, in a predetermined position relative to eyes of the user. As such, the facial interface 120 includes different portions that engage facial features as reference points (e.g., datums) for locating the display module 110 relative thereto. For example, the facial interface 120 includes brow portions 122 that engage the brow or forehead of the user, temple portions 124 that engage temples of the user, cheek portions 126 that engage the cheeks of the user, and a nose portion 128 that engages the nose of the user. The brow portions 122, the temple portions 124, the cheek portions 126, and the nose portion 128 may, in a cooperative manner, extend substantially continuously around the eyes of the user to prevent environmental light from reaching eyes of the user. In other examples, various portions of the facial interface 120 may be omitted (e.g., omitting the temple portions 124 and the cheek portions 126.

The facial interface 120 is a compliant interface, which varies in compliance corresponding to locations at which the facial interface 120 engages different facial features of the user. As will be discussed in further detail below, compliance characteristics of the facial interface 120 and the other compliant interfaces disclosed herein may be varied at different locations according to geometric stiffness, linearity of geometric stiffness, and maximum deflection. Geometric stiffness refers to the stiffness of one or more structures resultant from the geometry and material properties (e.g., Young's modulus) thereof. Geometric stiffness, as used herein to provide compliance, generally refers to axial stiffness (e.g., axial compressibility) that is in a direction generally normal (i.e., perpendicular) to the surface of the anatomical feature of the user engaged by the compliant interface. Geometric stiffness, however, also provides shear stiffness or resistance, so as to resist relative movement in planes generally parallel with the surface of the anatomical feature. Linearity of geometric stiffness refers to the variability of stiffness of one or more structures relative to deflection. For example, a two-part structure may have non-linear increasing stiffness resultant from the first structure having lower stiffness and becoming fully compressed prior to compression of the second structure having higher stiffness. In another example, a structure may have a non-linear decreasing stiffness resultant from buckling thereof. Maximum deflection refers to the distance over which the structure becomes fully compressed without plastic deformation, without failure, and/or otherwise under normal loading when the wearable device is worn by the user, which may include point loading from anatomical features. The compliance characteristics may be the individual and/or cumulative result of different compliant structures at a given location.

Still referring to the facial interface 120, the brow regions of the user may be the primary anatomical support that bears a majority of the force applied by the facial interface 120 to the face of the user and also serve as a primary reference point for locating the display module 110 relative to the eyes of the user. The cheek regions of the user, in contrast, may be a secondary anatomical support that bears less than a majority of the force applied by the facial interface 120 and serve as a secondary reference point for locating the display module 110, for example, by bearing sufficient force to pivot the display module 110 about the brow regions to properly orient the display module 110 relative to the face of the user. Furthermore, the cheek regions and the temple regions of the user may be soft-tissue regions for which sustained high levels of localized force levels (i.e., pressure) may provide discomfort to the user. As a result, the brow portion 122 of the facial interface 120 may be less complaint (e.g., having higher geometric stiffness and/or a lower maximum deflection) than the temple portions 124 and/or the cheek portions 126 to both reliably locate the display module 110 and provide enhanced comfort to the user by reducing pressure in sensitive regions. Furthermore, while the different portions (e.g., 122, 124, 126, and/or 128) of the facial interface 120 may have different compliance, each such portion may have variable compliance therein as discussed in further detail below.

The head interface 130 is coupled to the display module 110 and engages the head 10 of the user to support the display module 110 thereon. The head interface 130, as shown, includes a lower portion 132 that extends from one side of the display module 110 along sides of the head 10 of the user (e.g., as with bows or arms of glasses) or, as shown, around the head 10 of the user to the other side of the display module 110. The head interface 130 may also include one or more of a longitudinal upper portion 134 or a lateral upper portion 136, which are configured to engage upper cranial regions of the head 10 of the user (i.e., being entirely above the ears of the user, such as one, two, or more inches above the ears of the user.). The longitudinal upper portion 134 extends in longitudinal direction (i.e., front-to-back) from the display module 110 over the head 10 of the user to the lower portion 132 at the back of the head 10 of the user. The lateral upper portion 136 extends in a lateral direction (i.e., left-to-right) over the head 10 of the user between the left and right sides of the lower portion 132 (e.g., extending generally from ear-to-ear of the user).

The head interface 130 is a compliant interface, which may vary in compliance corresponding to locations at which the head interface 130 engages the head 10 of the user. For example, the lower portion 132 may include temple segments 132a and a back segment 132b. The temple segments 132a are positioned on left and right sides of the head and extend rearward from the display module 110 along the temple regions of the head 10 of the user to proximate the ears of the user. The back segment 132b, if provided, extends around the back of the head 10 of the user between the temple segments 132a. In the case of the head interface 130 having a form factor similar to glasses, the temple segments 132a may engage the sides (e.g., the temple regions) of the head 10 of the user and/or the ears of the user. In the case of the head interface 130 extending around the head 10 of the user, the lower portion 132 of the head interface 130 pulls the display module 110 and the facial interface 120 against the face of the user with the temple segments 132a being in tension along the temple regions of the head 10 of the user and the back segment 132b applying a normal force against and being in tension along the back side of the head.

The temple segments 132a may, relative to the back segment 132b if provided, have lower geometric stiffness to provide comfort in the temple regions, but may have relatively low maximum deflection because the temple segments 132a are primarily in tension with low normal force being applied to the temple regions. The back segment 132b may have relatively low compliance due to the low sensitivity of the back of the head (e.g., skull), but may have localized high compliance (e.g., in a center thereof, where engaging a point of the occipital bone meeting the parietal bone), such as lower geometric stiffness and/or greater maximum deflection.

The longitudinal upper portion 134 of the head interface 130, as referenced above, extends in a front-to-back direction from the display module 110 over the head 10 of the user to the lower portion 132 of the head interface 130. The lateral upper portion 136 of the head interface 130, as referenced above, extends in a left-to-right direction between left and right sides of the lower portion 132 of the head interface 130. The longitudinal upper portion 134 and the lateral upper portion 136 may be configured to have higher compliance (i.e., lower geometric stiffness and/or higher maximum deflection) in areas more sensitive and/or more prone to pressure concentration.

For example, different ethnicities of people may have heads with a central protruding point or instead with two outer protruding points. The longitudinal upper portion 134 may include a central segment 134a with higher compliance than a forward segment 134b and a rearward segment 134c adjacent thereto, which corresponds to and reduces pressure for improving comfort at the central protruding point of a more pointed head 10' of a user (see FIG. 1C with the central protruding point illustrated in an exaggerated manner). The central protruding point may be considered an upper cranial feature (e.g., being positioned at a top of the head, spaced above the ears by one, two, or more inches, and/or by having a surface that points largely upward).

The lateral upper portion 136 may also include a central segment 136a with higher compliance than intermediate segments 136b adjacent thereto, which corresponds to and reduces pressure to improve comfort at the central protruding point of the more pointed head 10' of the user. Referring to FIG. 1D, the lateral upper portion 136 may, instead or additionally, include outer segments 136c that are positioned outward of and have higher compliance than the intermediate segments 136b. The outer segments 136c correspond to the two outer protruding points of a more squared head 10" of a user, so as to reduce pressure to thereto and improve comfort at such locations of the head 10 of the user. The outer protruding points of the head 10" are illustrated in an exaggerated manner and may be considered upper cranial features (e.g., by being positioned near the top of the head 10", spaced above the ears by one, two, or more inches, and/or by having surfaces that point largely upward).

As is shown, the head interface 130 may include both the longitudinal upper portion 134 and the lateral upper portion 136, which may be coupled to each other and have the central segment 134a and the central segment 136a be a common portion of the head interface 130. Alternatively, the head interface 130 may include only the longitudinal upper portion 134 with the central segment 134a, the forward segment 134b, and the rearward segment 134c thereof, may include only the lateral upper portion 136 with the central segment 136a, the intermediate segments 136b, and the outer segments 136c, or may include neither the longitudinal upper portion 134 nor the lateral upper portion 136.

Referring to FIG. 2, a wearable device 200 is a headphones unit that generally includes two speaker modules 210, two ear interfaces 220 that are each associated with one of the two speaker modules, and a head interface 230. The speaker modules 210 each output sound to provide aural content to ears of the user. Each of the head-mounted display unit 100 and the headphones unit 200 may be considered a head-worn electronic device.

The two ear interfaces 220 are coupled to the speaker modules 210 and engage the user to support the speaker modules 210 in position for outputting sound to the ears of the user. The ear interfaces 220 may be provided in an over-ear configuration (as shown) or in an on-ear configuration. In the over-ear configuration, the two ear interfaces 220 engage portions of the head surrounding the ear for the user. In the on-ear configuration, two ear interfaces 220 engage the ear of the user.

The head interface 230 is coupled to the speaker modules 210 and engages the head to support the speaker modules 210 thereon. The head interface 230 extends over the head 10 of the user from the left to right sides (e.g., similar to the lateral upper portion 136 of the head interface 130 of the head-mounted display unit 100). The head interface 230, like the lateral upper portion 136, may include a central segment 230a that has higher compliance than intermediate segments 230b adjacent thereto and may, instead or additionally, include outer segments 230c that have higher compliance than the intermediate segments 230b.

Figure 3A:
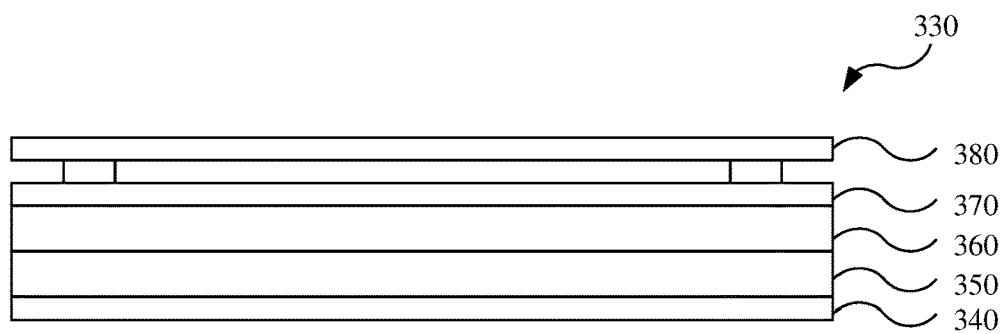
FIG. 3A is a partial front view of a compliant interface that may be used with the head-mounted display unit of FIGS. 1A-1D or the headphones unit of FIG. 2.
Figure 3B:
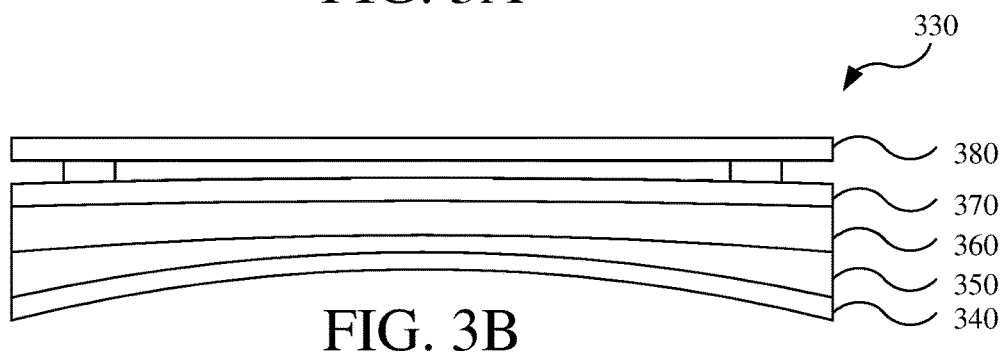
FIG. 3B is a partial front view of the compliant interface of FIG. 3A in a compressed state.
Figure 3C:
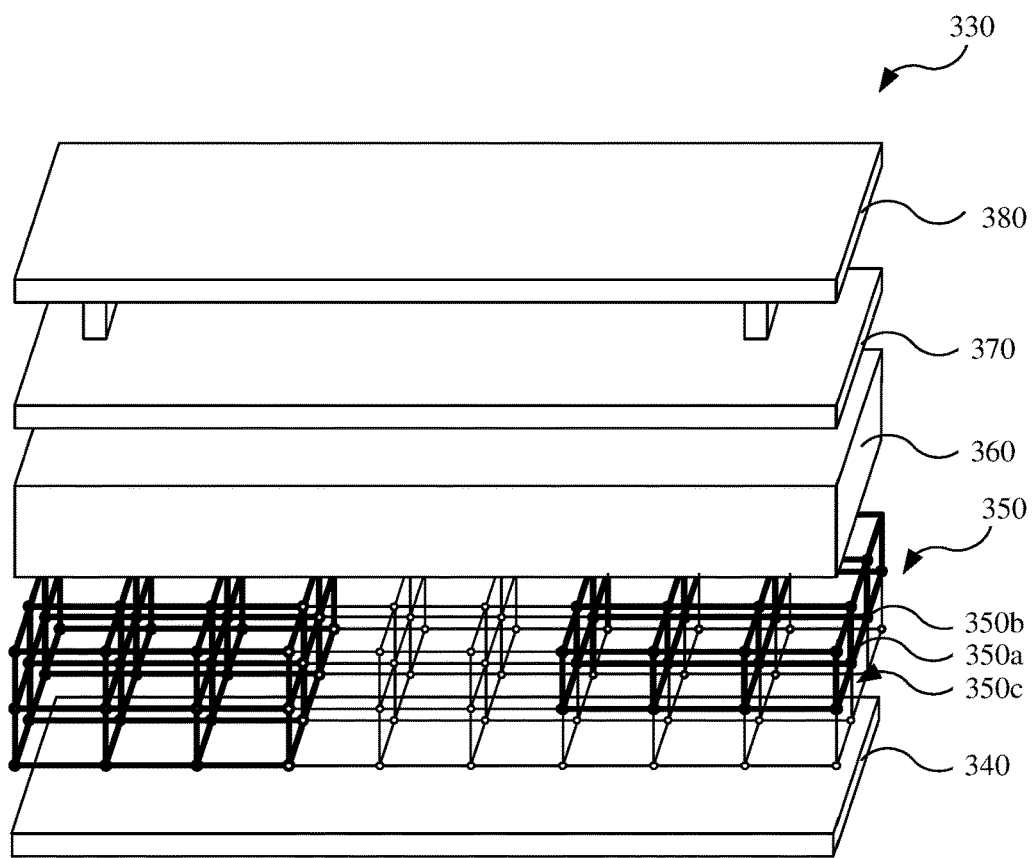
FIG. 3C is a perspective exploded view of the compliant interface of FIG. 3A.

Referring to FIGS. 3A-3C, the compliant interfaces may include various different features that provide the variable compliance. For example, a compliant interface 330, which may be any of the facial interface 120, the head interface 130, the head interface 230, or any portion or segment thereof, may include one or more compliant structures of an outer layer 340, a lattice structure 350, a foam structure 360, and/or a beam 370. The compliant interface 330 may also include a chassis 380 to which the compliant structures are coupled and which is in turn coupled to the electronic devices (e.g., the display module 110 and/or the speaker modules 210). The outer layer 340, the lattice structure 350, the foam structure 360, and the beam 370 cooperatively provide the compliant interface with variable compliance at different locations where engaging different anatomical features of the user. For example, as shown in FIG. 3A, the compliant interface 330 is shown in a relaxed state. As shown in FIG. 3B, the compliant interface 330 is shown in a conformed (e.g., compressed state) in which an anatomical feature of the user is presses against the compliant interface 330 causing compression and/or flexing of the outer layer 340, compression of the lattice structure 350, compression of the foam structure 360, and bending of the beam 370, while the chassis 380 remains generally undeformed.

The outer layer 340 is configured to contact the user and may, for example, include a textile fabric, an elastomer, a foam, or a combination thereof. The outer layer 340 is flexible, so as to follow the shape of the anatomical feature engaged thereby. The outer layer 340 may also be compressible in an axial direction (i.e., generally perpendicular to the anatomical feature), so as to conform thereto. Relative to the lattice structure 350 and/or the foam structure 360, the outer layer 340 may have relatively low maximum deflection (e.g., being relatively thin). In one embodiment, the outer layer 340 may be generally uniform over the compliant interface 330, for example, having a generally constant material composition, thickness, and/or properties over a substantial majority (e.g., 90% or more) of the surface area where contacting the anatomical feature (e.g., where the facial interface 120 engages the face of the user and/or where the head interfaces 130, 230 engage the head 10 of the user).

The lattice structure 350 is a compliant structure, which may be a unitary structure that is formed, for example, of a silicone, rubber, or other elastomer. The lattice structure 350 is compressible in the axial direction. The axial compressibility (i.e., axial compliance) may vary by lateral location (i.e., corresponding to the anatomical feature) and/or by depth (i.e., by having non-linear geometric stiffness and/or varying maximum dimension). The axial compliance is provided according to the material forming the lattice structure 350 and the structural features formed thereby. The material forming the lattice structure 350 may, for example, be a silicone, rubber, or other elastomer. The structural features to achieve the desired compliance at different locations with the selected material may be determined by computer modeling tools, which take as inputs the selected material and desired properties, and generate a model of the structural features therefrom.

As shown in the exploded view of FIG. 3C, the lattice structure 350 is a three-dimensional structure that generally includes segments 350a (e.g., segments) extending in three dimensions and that are interconnected to each other at joints 350b (e.g., nodes) to form the three-dimensional structure and that define windows 350c (e.g., voids between the segments 350a). Each of the segments 350a may have a uniform shape (e.g., constant cross-section, as is shown). Different ones of the segments 350a and/or the joints 350b may have uniform shapes (i.e., the same cross-sections and/or lengths as each other). Further, the segments 350a and/or the joints 350b may be arranged cooperatively in a uniform manner (e.g., spacing and/or orientations), such that the lattice structure 350 has uniform shape throughout. Alternatively, each of the segments 350a may have a non-uniform shape (e.g., a varying cross-sectional size and/or shape), different ones of the segments 350a and/or the joints 350b may have different shapes, and/or the segments 350a and/or the joints 350b may be cooperatively arranged in non-uniform manners throughout the lattice structure 350, which may provide the lattice structure 350 with varying compliance properties throughout. For example, as illustrated in FIG. 3C, one lateral portion of the lattice structure 350 may include segments 350a and/or joints 350b that provide greater geometric stiffness than another lateral portion (e.g., by having more material, as illustrated by thicker lines) and/or a portion may have non-linear geometric stiffness, for example, increasing in stiffness moving away from the user (e.g., by having more material away from the user than adjacent the user, as illustrated by thicker lines). While the segments 350a and joints 350b are depicted as having a regular pattern (e.g., forming rectangular prisms), in other applications, the lattice structure 350 may include segments 350a and joints 350b that may appear to have a random (e.g., organic appearance), while still providing the desired compliance properties. The lattice structure 350 has a generally open structure, such that in a relaxed state, material forming the lattice structure 350 forms less than 35% of the volume of the lattice structure 350 (e.g., 25%, 20%, 15%, or less) when in an uncompressed state (see, e.g., FIGS. 3A and 3C). The lattice structure 350 may also be referred to as a three-dimensional lattice structure or lattice support structure.

The lattice structure 350, in addition to providing desired properties of axial compliance as generally described above (i.e., compliance in generally normal direction to the anatomical feature of the user), may additionally provide desired properties of lateral (e.g., shear stability). For example, the segments 350a, rather than being arranged only perpendicular to and parallel with a shear plane, as shown, may instead be arranged out of plane, such that compression of the segments 350a may resist shearing.

The lattice structure 350 may, for example, be formed via additive manufacturing or three-dimensional printing. In the case of silicone being the selected material, layers of liquid silicone material are successively provided and cured (e.g., via a UV cure) to gradually build the lattice structure 350. In another example, a mold for the lattice structure 350 may be formed (e.g., via additive manufacturing of three-dimensional printing), filled with the selected material (e.g., liquid silicone), the selected material cured, and the mold removed (e.g., precipitating out).

The structure that includes the lattice structure 350 may further include additional features formed therewith, such as a continuous outer layer (e.g., in place of or to which the outer layer 340 is coupled), tubular channels (e.g., to route fluid, such as for cooling), and/or coupling features by which the lattice structure 350 is coupled to the electronic device or to an intermediate feature of the compliant interface 330, such as the foam structure 360 and/or the beam 370).

As referenced above, and illustrated in FIG. 3C, the compliance of the lattice structure 350 may vary by location having different geometric stiffness, non-linear geometric stiffness, and/or maximum deflection (e.g., thickness). For example, greater compliance of the lattice structure 350 may include having a geometric stiffness that is half or less than at other locations, and/or may include having a maximum deflection or thickness that is twice or greater than at other locations. Between locations of the lattice structure 350, the compliance may preferably vary in a gradual manner, or in an abrupt or stepped manner.

In the case of the facial interface 120, the lattice structure 350 and/or the compliant interface 330 as a whole may have greater compliance in the cheek portions 126 (e.g., having lower geometric stiffness and/or greater maximum deflection) than in the brow portions 122. In a further example, the lattice structure 350 may be provided in the cheek portions 126 but not the brow portions 122. In the case of the lower portion 132 of the head interface 130, the lattice structure 350 and/or the compliant interface 330 may have greater compliance in the temple segments 132a (e.g., lower geometric stiffness) than in the back segment 132b. In the case of the longitudinal upper portion 134 of the head interface 130, the lattice structure 350 and/or the compliant interface 330 may have greater compliance in the central segment 134a corresponding to the central protruding point of the head than in the forward segment 134b or the rearward segment 134c (e.g., having lower geometric stiffness and/or greater maximum deflection). In the case of the lateral upper portion 136 of the head interface 130 or the head interface 230, the central segment 136a, 230a of the lattice structure 350 and/or the compliant interface 330 may have greater compliance than the intermediate segments 136b, 230b and/or than the outer segments 136c, 230c (e.g., having lower geometric stiffness and/or greater maximum deflection). Instead or additionally, the outer segments 136c, 230c of the lattice structure 350 and/or the compliant interface 330 may have greater compliance than the central segments 136a, 230a and/or the intermediate segments 136b, 230b (e.g., having lower geometric stiffness and/or greater maximum deflection).

The foam structure 360 may include one or more suitable viscoelastic open or closed cell foam material, such as silicone-, neoprene-, polyurethane-, or other elastomer-based foam materials. The foam structure 360 is compressible in the axial direction, which may vary by lateral location (i.e., corresponding to the anatomical feature) and/or by depth (i.e., by having a non-linear geometric stiffness and/or varying maximum dimension). The axial compliance may be varied according to the selected foam material, density, and/or thickness at the different locations. In some embodiments, the material of the foam structure 360 may be encased or otherwise engaged by another material which pre-compresses material forming the foam structure 360 to provide the variable compliance. For example, the material forming the foam structure 360 may, in a relaxed state, have different thicknesses at different locations, but be encased so as pre-compress (i.e., before engaging the user) material forming the foam structure 360. Those areas of the foam structure 360 that, without the pre-compression, would be thicker will have lower compliance (e.g., higher geometric stiffness and/or lower maximum deflection) than those areas without the pre-compression.

As referenced above, the compliance of the foam structure 360 may vary by location having different geometric stiffness and/or maximum deflection (e.g., thickness). For example, greater compliance of the foam structure 360 may include having a geometric stiffness that is half or less than that at other locations, and/or may include having a maximum deflection or thickness that is twice or greater than at other locations. Between locations, the compliance of the foam structure 360 may preferably vary in a gradual manner or in an abrupt or stepped manner. The foam structure 360 may have more or less compliance in manners complementary to (e.g., the same relative compliance) as the lattice structure 350 described above.

The beam 370 is a deflectable member that deflects (e.g., bends) upon unequal application of force thereto, for example, by the different anatomical features. The beam 370, thereby, provides further compliance to the compliant interface 330. The beam 370 may be configured to bend under normal loading during use of the wearable electronic device but may generally not be compressible (e.g., being a plastic or metal member that is molded or stamped). Such bending and non-compression of the beam 370 is illustrated in FIG. 3B.

The beam 370 may have a generally uniform compliance (e.g., bending stiffness) or may vary by location, for example, having lower bending stiffness at locations corresponding to protruding anatomical features (e.g., the nose, the central and/or outer protruding points of the head), so as to distribute more force to locations adjacent thereto.

The chassis 380 is a base structure to which the compliant structures (e.g., the outer layer 340, the lattice structure 350, the foam structure 360, and/or the beam 370) are directly or indirectly coupled and by which the compliant interface 330 is in turn coupleable to the electronic components (e.g., the display module 110 of the head-mounted display unit 100 or the speaker modules 210 of the headphones unit 200), for example, via magnetic and/or mechanical interfaces (e.g., latches, interference fit, and/or interfitting structures). The chassis 380 may be a generally rigid member (e.g., a backing plate for the facial interface 120, or band of the head interfaces 130, 230), a sprung member (e.g., to elastically widen to accommodate the head 10 of the user, such as a band of the head interfaces 130, 230), or may be flexible (e.g., an elastic or inelastic fabric forming a band of the head interfaces 130, 230). In some embodiments, the beam 370 may function as the chassis 380 in which case the chassis 380 provides variable compliance. In still further embodiments, the beam 370 may be omitted with the other compliant structures being coupled directly or indirectly to the chassis 380.

While having variable compliance at different locations, the compliant interface 330 may be otherwise configured to have a generally consistent (e.g., uniform) appearance at such locations. For example, the compliant interface 330 may, when not engaged with the anatomical features, have a generally constant thickness (e.g., a common thickness) measured from the innermost surface (e.g., the outer layer 340) and the outermost surface (e.g., the chassis 380 or other covering) at and/or between different locations having different compliance (e.g., differing by 50% of geometric stiffness and/or maximum deflection). For example, the facial interface 120 may have generally the same thickness (e.g., within 40% or less, such as 25%, 10%, or less) between the display module 110 and the brow regions of the user (i.e., of the brow portions 122) and between the display module 110 and the cheek regions of the user (i.e., of the cheek portions 126), while providing different compliance characteristics therebetween. For example, the head interfaces 130, 230 may have generally the same thickness (e.g., within 40% or less, such as 25%, 10%, or less) between the outer surface thereof (e.g., formed by the chassis 380 or other cover) and the inner surface thereof (e.g., formed by the outer layer 340) in the intermediate segments 136b, 230b and the central segments 136a, 230a and/or the outer segments 136c, 230c while providing different compliance therebetween.

In still further variations, the compliant interface 330 may include compliant structures that have changeable compliance characteristics. For example, the compliant interface 330 may include a sealable volume that receives a fluid (e.g., air) to change compliance characteristics (e.g., stiffness) and/or size thereof. In another example, the compliant interface 330 may include mechanical actuators that change one of the compliance characteristics, for example, by compressing the compliant interface 330 to increase stiffness of the compliant interface 330 and/or by decreasing maximum deflection of the compliant interface 330 at one or more locations. Furthermore, the compliant characteristics of the compliant interface 330 may be changeable over time, for example, to change force distribution between different anatomical features over time in a gradual or abrupt manner (e.g., shifting weight from one upper cranial region to another).

Variations of the compliant interface 330 are contemplated. For example, rather than the foam structure 360 being located between the lattice structure 350 and the beam 370, the lattice structure 350 may be located between the foam structure 360 and the beam 370. In further examples, one or more of the outer layer 340, the lattice structure 350, the foam structure 360, and/or the beam 370 may be omitted at one or more locations. For example, the outer layer 340 may be entirely omitted (e.g., whereby the lattice structure 350 and/or the foam structure 360 directly engages the user), the lattice structure 350 may be omitted in one, or more, or all locations (e.g., the lattice structure 350 may be omitted in the brow portion 122 of the facial interface 120), the foam structure 360 may be omitted in one, more, or all locations (e.g., with compliance being primarily provided by the lattice structure 350), and/or the beam 370 may be omitted in one or more locations (e.g., instead having chassis 380 be rigid and configured to not bend under expected loading during use of the wearable device, or the lattice structure 350 and/or the foam structure 360 being configured to couple directly to the electronic device).

As referenced above, the compliance of the compliant interface 330 varies by location, which is cooperatively provided compliant structures thereof (e.g., the outer layer 340, the lattice structure 350, the foam structure 360, and/or the beam 370). Between locations, the compliance of the compliant interface 330 of the foam structure 360 may preferably vary in a gradual manner, but may change in an abrupt or stepped manner. For example, the geometric stiffness of the lattice structure 350 may vary gradually moving laterally (e.g., changing geometry, changing material thickness, and/or changing overall thickness gradually) and/or the geometric stiffness of the foam structure 360 may vary gradually moving laterally (e.g., changing in density and/or pore size, material thickness, and/or material composition).

Referring to FIGS. 4-7, the compliant interface 330 may be provided in different manners to account for different users, such as a prefabricated compliant interface 430 with predetermined compliance characteristics, a partially customizable compliant interface 530 having interchangeable components with predetermined compliance characteristics, a partially customizable compliant interface 630 with components having customized compliance characteristics uniquely determined for the user, and/or an fully customized compliant interface 730 with compliance characteristics uniquely determined for the user. As will be discussed in further detail below with respect to FIG. 8, the compliant interfaces 430, 530, 630, 730 or components thereof may be selected or uniquely customized according to the unique facial characteristic of each user. For example, a three-dimensional scan of the face and/or head of the user may be performed to analyze the size, shape, and/or location of various anatomical features (e.g., eyes, forehead, cheeks, nose, temples, and/or other features of the head) according to which the compliant interfaces 430, 530, 630, 730 or components thereof are selected or uniquely customized. As a result, for example, an adult and a small child may have and use different compliant interfaces that are interchangeably coupleable to the common display module 110, such as different temple segments 132a (e.g., longer and thinner for the adult, while shorter and thicker for the child).

Figure 4:
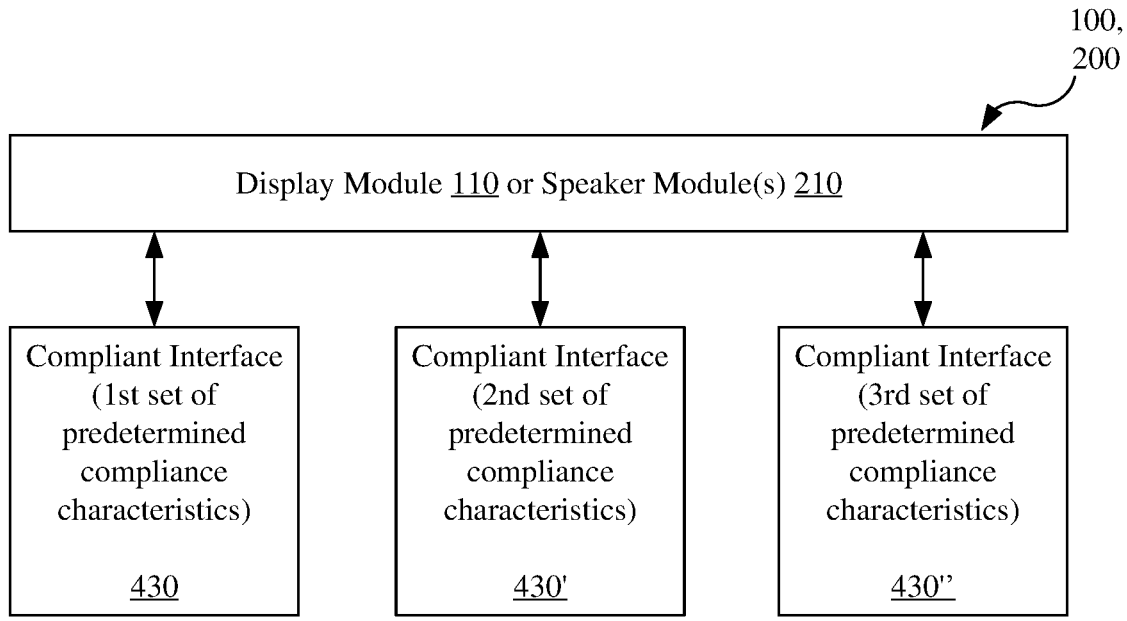
FIG. 4 is a schematic view of a wearable electronic device with variants of compliant interfaces having different predetermined compliance characteristics interchangeably coupleable thereto.

Referring to FIG. 4, in the case of the compliant interface 430 having predetermined compliance characteristics, each component of the compliant interface 430 is predetermined and assembled thereto. For example, the compliant interface 430 includes one or more of the compliant structures (e.g., the outer layer 340, the lattice structure 350, the foam structure 360, and/or the beam 370) and/or the chassis 380 having fixed, non-interchangeable components, which provide a first set of predetermined compliance characteristics. Multiple different versions of the compliant interface 430', 430" with different sets of predetermined compliance characteristics may be provided and be interchangeably coupleable to the display module 110, however, to account for users with different anatomical features (e.g., for different sizes, facial shapes, and/or ethnicities). One of the different compliant interfaces 430, 430', 430" may be selected according to generalized criteria (e.g., age, size, and/or ethnicity) or may be selected according to the three-dimensional scan or other automated analysis of the face and/or head of the user. It should be understood that while three different versions of the compliant interface 430, 430', 430" are illustrated different numbers of the compliant interface 430 with predetermined compliance characteristics may be available to be selected from.

Figure 5:
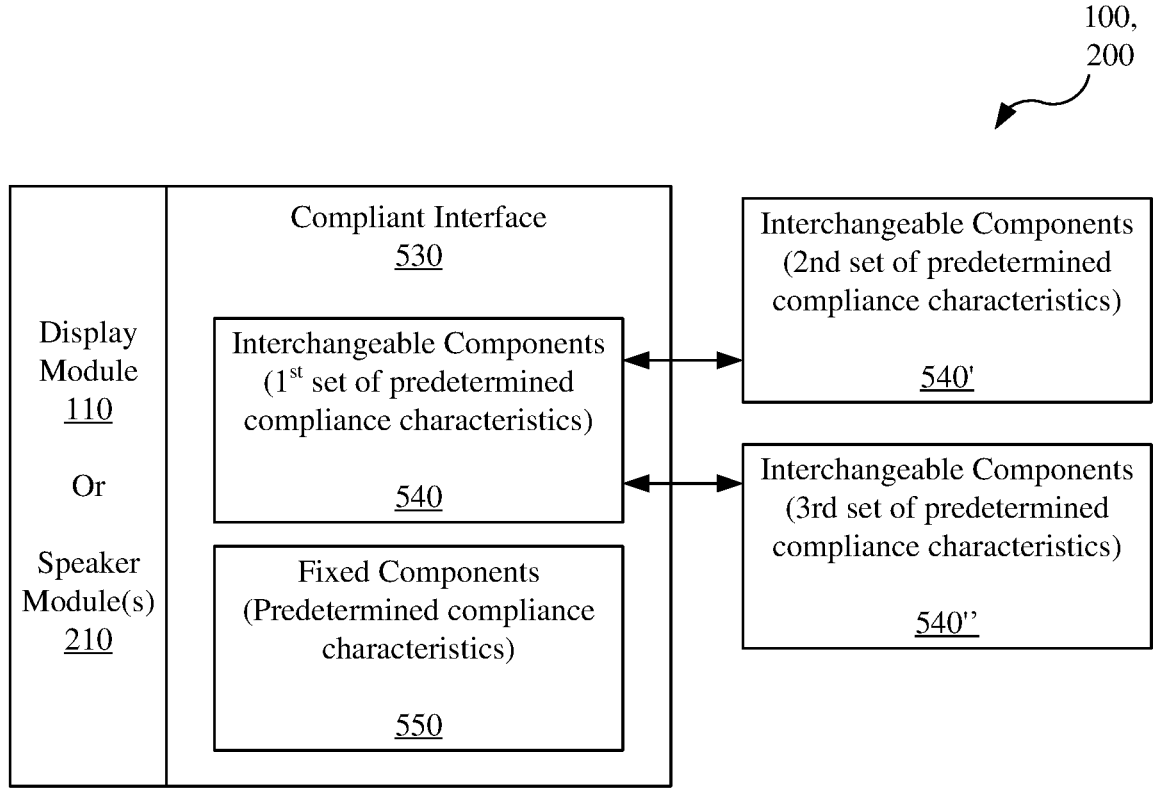
FIG. 5 is a schematic view of a wearable electronic device having a compliant interface having interchangeable components with different sets of predetermined compliance characteristics.

Referring to FIG. 5, in the case of the partially customizable compliant interface 530, the compliant interface 530 includes a predetermined set of interchangeable components 540 that have different sets predetermined compliance characteristics and other, non-interchangeable components 550 that are non-interchangeable. The interchangeable components 540 are interchangeably coupleable to the compliant interface 530 with other interchangeable components 540', 540" that have different predetermined compliance characteristics. The interchangeable components 540 may, for example, include the cheek portions 126 of the facial interface 120 (or lateral subsegment or compliant subcomponent thereof), while the brow portions 122 are non-interchangeable components 550. In other examples, any one or more of the brow portions 122, the temple portions 124, the cheek portions 126, and/or the nose portion 128 (or lateral subsegment or compliant subcomponent thereof) may be an interchangeable component 540. The interchangeable components 540 may also include one or more of the lower portion 132, the longitudinal upper portion 134, and/or the lateral upper portion 136 of the head interface 130, or lateral subsegment or compliant subcomponent thereof, or similar portions, subsegments, or subcomponents of the head interface 230. For example, the interchangeable components 540 may include one or more of the central segments 134a, 136a, 230a, the intermediate segments 136b, 230b, and/or the outer segments 136c, 230c or compliant subcomponent thereof. Each of the interchangeable components 540 is removably coupleable, directly or indirectly, to the chassis 380, the facial interface 120, or the head interface 130 described previously. For example, the interchangeable components 540 may be removably couplable using any suitable mechanism, such as hook and loop fasteners, threaded fasteners, interference fit, or other coupling mechanism (e.g., springs, clips, male/female interfaces).

The interchangeable components 540 and variants thereof may include one or more of the compliant structures (e.g., the outer layer 340, the lattice structure 350, the foam structure 360, and/or the beam 370). For example, the interchangeable component 540 may include both the lattice structure 350 and the foam structure 360, only the lattice structure 350, or only the foam structure 360. The interchangeable components 540 may correspond to those anatomical features having the greatest variation among users, such as the cheek portions 126 of the facial interface 120, the central segments 134a, 136a, 230a of the head interfaces 130, 230 (e.g., of the longitudinal upper portion 134 and/or the lateral upper portion 136), and/or the outer segments 136c, 230c of the lateral upper portion 136 of the head interface 130 or the head interface 230. The compliant interface 530 may be provided as a kit that includes the compliant interface 530 and each of the predetermined variants of the interchangeable components 540, 540', 540". One of the different interchangeable components 540, 540', 540" may be selected according to generalized criteria (e.g., age, size, and/or ethnicity) or may be selected according to the three-dimensional scan or other automated analysis of the face and/or head of the user. It should be understood that while three different versions of the interchangeable components 540, 540', 540" are illustrated different numbers of the compliant interface 530 with predetermined compliance characteristics may be available to be selected from.

Figure 6:
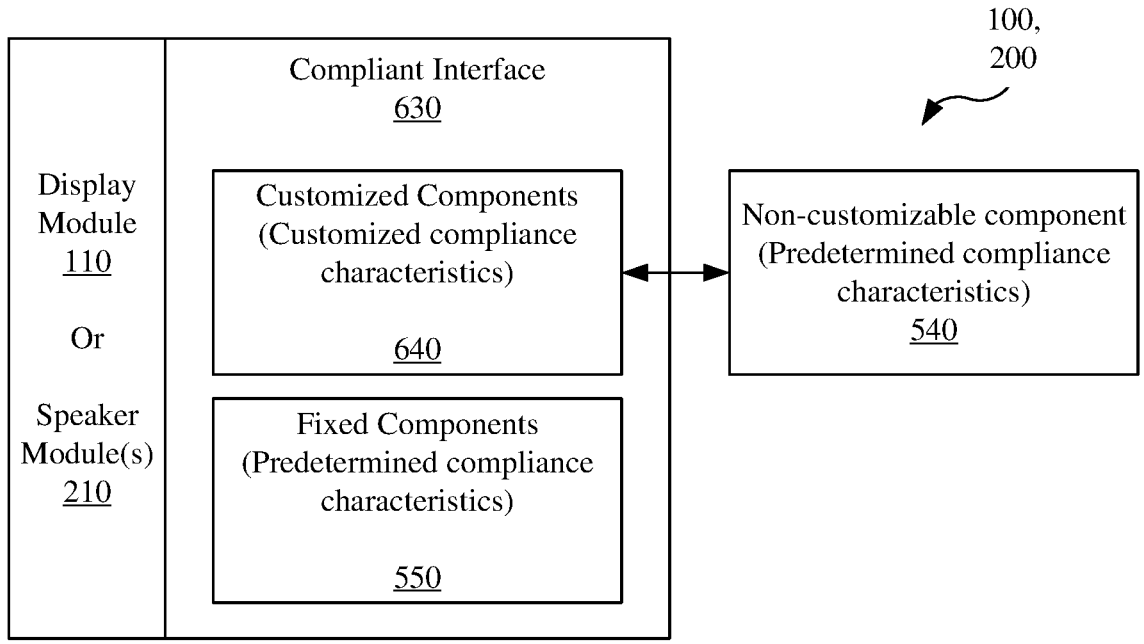
FIG. 6 is a schematic view of a wearable electronic device having a compliant interface having interchangeable components with customizable and predetermined compliance characteristics.

Referring to FIG. 6, in the case of the partially customizable compliant interface 630, the compliant interface 630 includes a predetermined set of customized components 640 that have customized compliance characteristics and other, non-interchangeable components 550 that are non-interchangeable. The customized components 640 have compliance characteristics and/or dimensions that are customized to the user, for example, by assessing the anatomical characteristics of the user (e.g., the shape of the face or the head 10 of the user) and uniquely fabricating the customized component 640 according thereto (e.g., by manufacturing the lattice structure 350 via additive manufacturing and/or shaping the foam structure 360). Compliance characteristics and/or dimensions of the customized component 640 may be uniquely determined according to the three-dimensional scan or other automated analysis of the face and/or head of the user with the customized component 640 being uniquely manufactured according thereto.

The customized components 640 may include one or more of the compliant structures (e.g., the outer layer 340, the lattice structure 350, the foam structure 360, and/or the beam 370). For example, the customized component 640 may include both the lattice structure 350 and the foam structure 360, only the lattice structure 350, or only the foam structure 360. The customized components 640 may correspond to those anatomical features having the greatest variation among users, such as the cheek portions 126 of the facial interface 120, the central segments 134a, 136a, 230a of the head interfaces 130, 230 (e.g., of the longitudinal upper portion 134 and/or the lateral upper portion 136), and/or the outer segments 136c, 230c of the lateral upper portion 136 of the head interface 130 or the head interface 230. The compliant interface 630 may be initially provided with one or more interchangeable components 540 having a set of predetermined compliance characteristics (as discussed above), which may allow the compliant interface 630 to be used, for example, while the customized component 640 is being manufactured or for use by other users.

The customized components 640 may, for example, be those of the facial interface 120, the head interface 130, and/or the head interface 230 identified above as one of the interchangeable components 540. The customized components 640 may be coupled to the compliant interface 630 (e.g., the chassis 380, the facial interface 120, or the head interface 130) removably using any suitable mechanism, such as hook and loop fasteners, threaded fasteners, interference fit, or other coupling mechanism (e.g., springs, clips, male/female interfaces).

Figure 7:
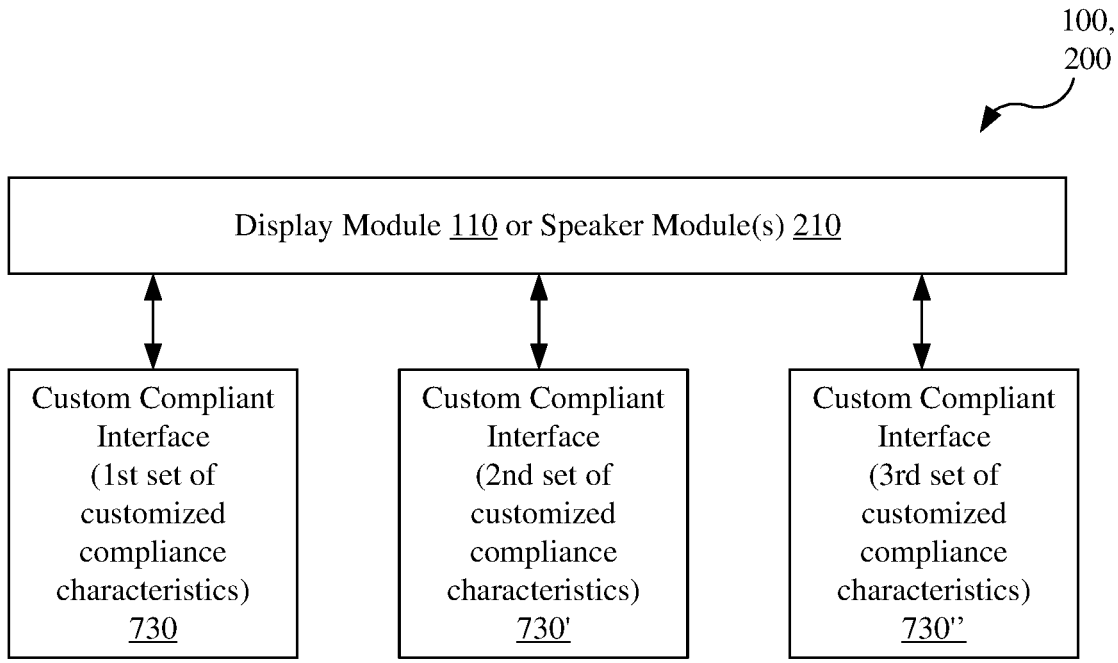
FIG. 7 is a schematic view of a wearable electronic device with variants of compliant interfaces having different customized compliance characteristics interchangeably coupleable thereto.

Referring to FIG. 7, the fully-customized compliant interface 730 is customized in locations corresponding to most or all anatomical features engaged by the customized compliant interface 730. The compliant interface 730 has compliance characteristics that are customized to the user, for example, by assessing the anatomical characteristics of the user (e.g., the shape of the face or the head 10 of the user) and fabricating the compliant interface 730 according thereto (e.g., by manufacturing the lattice structure 350 via additive manufacturing and/or shaping the foam structure 360). Compliance characteristics and/or dimensions of the customized compliant interface 730 may be uniquely determined according to the three-dimensional scan or other automated analysis of the face and/or head of the user with the customized compliant interface 730 being uniquely manufactured according thereto.

The customized dimensions and/or compliance characteristics may be provided by one or more of the compliant structures of the compliant interface 730, while the other compliant structures have predetermined compliance characteristics. For example, the compliant interface 730 may include the lattice structure 350 as a fully-customizable component, while the outer layer 340, the foam structure 360, and/or the beam 370 (if included) have predetermined compliance characteristics. Thus, different users may have different fully-customized compliant interfaces 730, 730', 730" with different customized compliance characteristics, which may form the facial interface 120 and/or the head interface 130 and may further be interchangeably coupleable to the display module 110 to allow different users of the head-mounted display unit 100.

Figure 8:
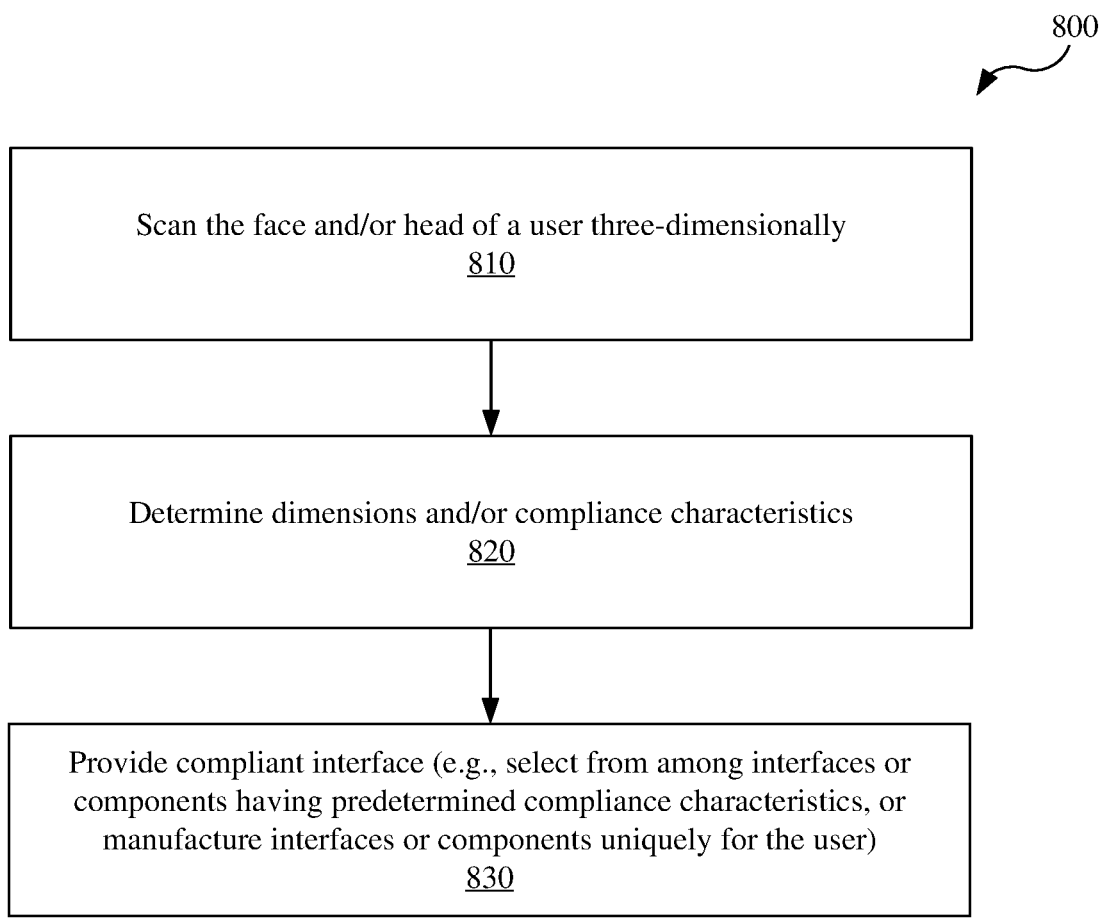
FIG. 8 is a flowchart of a method for providing a compliant interface.

Referring to FIG. 8, a method 800 is directed to providing a compliant interface of a head-mounted display for a user. The method 800 includes scanning 810 the face and/or head of the user three-dimensionally, determining 820 dimensions and/or compliance characteristics of the compliant interface according to the scanning 810, and providing 830 the compliant interface according to the determining 820.

The scanning 810 of the face and/or head may be performed, for example, with any suitable three-dimensional scanning device (e.g., using depth sensors and/or imaging devices).

The determining 820 of the dimensions and/or compliance characteristics may be performed, for example, with any suitable computing device executing software instructions for facial analysis (e.g., identifying the shape, size, and/or location of facial features corresponding to portions of the compliant interfaces having predetermined or customizable dimensions and/or compliance characteristics).

The providing 830 of the compliant interface may, for example, include any one or more of: providing the compliant interface selected from multiple compliant interfaces having predetermined dimensions and compliance characteristics selected according to the determining 820 (e.g., the compliant interface 430), providing the compliant interface with interchangeable compliant components having predetermined dimensions and compliance characteristics selected according to the determining 820 (e.g., the compliant interface 530), providing the compliant interface with interchangeable compliant components having dimensions and/or compliance characteristics uniquely manufactured according to the determining 820 (e.g., the compliant interface 630), and/or providing the compliant interface with fixed dimensions and/or compliance characteristics manufactured according to the determining 820 (e.g., the custom compliant interface 730).

Figure 9:
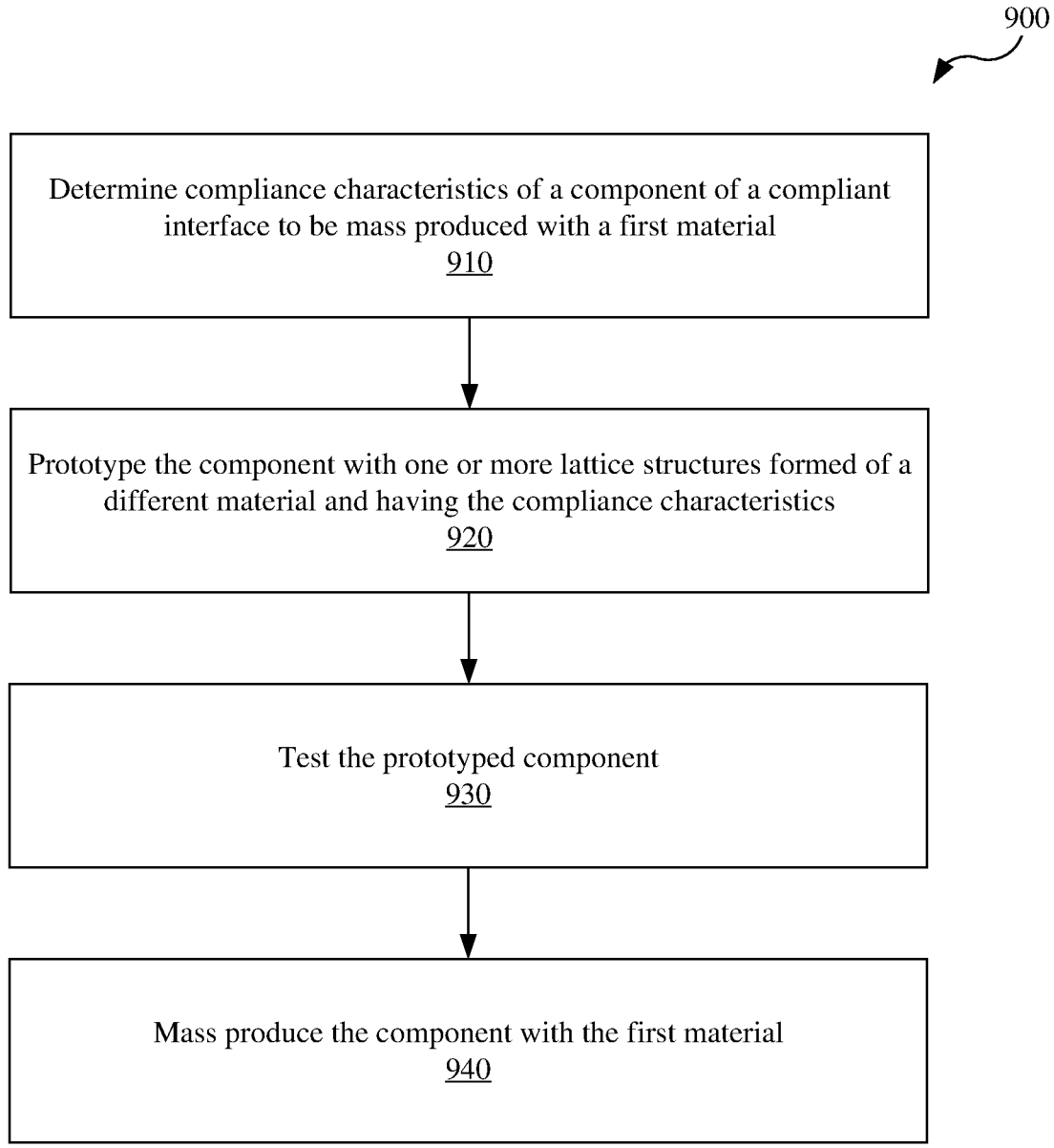
FIG. 9 is a flowchart of a method for producing compliant interfaces.

Referring to FIG. 9, the lattice structure 350 may, instead of or in addition to use in a finished compliant interface 330, be useful as a development tool. In particular, the lattice structure 350 may be generated to simulate compliant interfaces 330 or components thereof that may ultimately be made of different materials. For example, while the compliant interface 330 may be made with a component formed of a foam material in mass production, during development, the compliant interface 330 may instead be made with a component formed with the lattice structure 350 having the same (e.g., design or production-intent) compliance characteristics. For example, as referenced above, a computer tool may generate the design of the lattice structure 350 to have desired compliance characteristics, which may be those of the foam material. With use of additive manufacturing or three-dimensional printing, the component may be prototyped more quickly with the lattice structure 350 than with foam obtained from an outside supplier.

Furthermore, the lattice structure 350 may be formed with highly consistent compliance properties, while the foam material may have highly variable material properties (e.g., having variability in the voids formed therein). Accordingly, the component may be prototyped with multiple variations of the lattice structure 350 that simulate the production-intent foam (or other material) with different compliance properties.

Thus, referring to FIG. 9, a method 900 is provided for developing and producing a compliant interface, which may be any of the facial interface 120, the head interface 130, the head interface 230, or components or segments thereof. The method 900 includes determining 910 compliance characteristics of a component to be made of a production material for a compliant interface of a wearable electronic device, prototyping 920 the component with a prototyping material, different from the production material, to have one or more lattice structures having the compliance characteristics (e.g., design intent and/or accounting for variability of production material), testing 930 the prototyped component formed with the one or more lattice structures (e.g., for user comfort and/or durability), and mass producing 940 the component with the production material and/or the compliant interface comprising the same.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

As described above, one aspect of the present technology is the gathering and use of data available from various sources to customize compliant interfaces for users. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to customize compliant interfaces for users. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of customized compliant interfaces, the present technology can be configured to allow users to select to "opt in" or "opt out" of participation in the collection of personal information data. In another example, users can select to not provide personal information for customizing compliant interfaces, for example, instead self-selecting components of the compliant interface. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, compliant interfaces may be provided based on non-personal information data or a bare minimum amount of personal information, such as the compliant interfaces being provided according to general personal information, such as age range and/or ethnicity.

What is claimed is:

1. A head-mounted display unit comprising:
    a display module; and
    a compliant interface coupled to the display module and including a three-dimensional lattice structure that is compressible with a variable compliance according to a compliance characteristic of the three-dimensional lattice structure to conform to one or more of a facial feature or an upper cranial feature of a user wearing the head-mounted display unit.

2. The head-mounted display unit of claim 1,
    wherein the three-dimensional lattice structure is formed of silicone that forms less than 35% of a volume of the three-dimensional lattice structure in an uncompressed state, and
    compliance of the facial interface varies by locations at which the compliant interface engages the user according to geometric stiffness of the three-dimensional lattice structure.

3. The head-mounted display unit of claim 1, wherein the three-dimensional lattice structure is formed of an elastomer that forms less than 35% of a volume of the three-dimensional lattice structure in an uncompressed state.

4. The head-mounted display unit of claim 3, wherein the three-dimensional lattice structure is formed by one of additive manufacturing or molding.

5. The head-mounted display unit of claim 3, wherein the elastomer is silicone.

6. The head-mounted display unit of claim 1, wherein compliance of the compliant interface varies by locations at which the compliant interface engages the user.

7. The head-mounted display unit of claim 6, wherein the compliance of the compliant interface varies by the locations according to maximum deflection of the three-dimensional lattice structure.

8. The head-mounted display unit of claim 1, further comprising one or more of an outer layer that engages the user or a foam structure.

9. The head-mounted display unit of claim 1, wherein the compliant interface is one of a facial interface or a head interface.

10. The head-mounted display unit of claim 1,
    wherein the three-dimensional lattice structure is formed of silicone that forms less than 35% of a volume of the three-dimensional lattice structure in an uncompressed state, and
    wherein compliance of the facial interface varies by locations at which the compliant interface engages the user according to a maximum deflection of the three-dimensional lattice structure.

11. A compliant interface for a head-worn electronic device comprising:
    a chassis; and
    compliant structures coupled to the chassis that provide variable compliance according to a compliance characteristic of the compliant structures at different locations at which the compliant interface engages anatomical features of a head of a user wearing the head-worn electronic device, one or more of the compliant structures being a three-dimensional lattice structure.

12. The compliant interface of claim 11, wherein the compliant interface extends left-to-right over the head of the user and includes a central segment and outer segments extending from opposite sides of the central segment, the central segment and the outer segments having a common thickness,
    the compliant structures provide the central segment and the outer segments with the different compliance that varies by one or more of geometric stiffness or maximum deflection, and
    one of the central segment corresponds to a central protruding point of the head of the user and has greater compliance than the outer segments, or the outer segments correspond to outer protruding points of the head of the user and have greater compliance than the central segment.

13. The compliant interface of claim 11, wherein the compliant interface extends left-to-right over the head of the user and includes a central segment and outer segments extending from opposite sides of the central segment, and the compliant structures provide the central segment and the outer segments with different compliance.

14. The compliant interface of claim 13, wherein the different compliance of the central segment and the outer segments includes geometric stiffness.

15. The compliant interface of claim 14, wherein the different compliance differs in geometric stiffness or maximum deflection by at least 50%.

16. The compliant interface of claim 15, wherein the different compliance varies gradually between the central segment and the outer segments.

17. The compliant interface of claim 15, wherein the central segment corresponds to a central protruding point of the head of the user and has greater compliance than the outer segments.

18. The compliant interface of claim 13, wherein the outer segments correspond to outer protruding points of the head of the user and have greater compliance than the central segment.

19. A method for providing a compliant interface for a wearable electronic device, the method including:
  scanning one or more of a head or a face of a user in three dimensions;
  determining compliance characteristics that provide a variable compliance for a compliant interface according to the scanning; and
  providing the compliant interface fabricated according to the determined compliance characteristics.

20. The method of claim 19, wherein providing the compliant interface includes selecting the compliant interface or a component of the compliant interface having predetermined compliance characteristics.

21. The method of claim 19, wherein determining compliance characteristics includes determining the compliance characteristics that are unique to the user according to the scanning, and providing the compliant interface includes uniquely manufacturing the compliant interface with the compliance characteristics unique to the user.

22. The method of claim 21, wherein the compliant interface includes a three-dimensional lattice structure.

23. The method of claim 22, wherein the three-dimensional lattice structure is formed of an elastomer with an additive manufacturing process.

24. The method of claim 19, wherein the compliant interface is one of a facial interface for a head-mounted display unit, a head interface for a head-mounted display unit, or a head interface for a headphones unit.

* * * * *